US005682989A

United States Patent [19]
Taniyama

[11] Patent Number: 5,682,989
[45] Date of Patent: *Nov. 4, 1997

[54] STORAGE CONTAINER FOR MINI-DISK CARTRIDGES

[75] Inventor: Yoshihiko Taniyama, Alpharetta, Ga.

[73] Assignee: Sony Corporation, Tokyo, Japan

[*] Notice: The portion of the term of this patent subsequent to Nov. 10, 2013, has been disclaimed.

[21] Appl. No.: 662,832

[22] Filed: Jun. 12, 1996

Related U.S. Application Data

[60] Continuation of Ser. No. 392,204, Feb. 22, 1995, which is a division of Ser. No. 227,903, Apr. 15, 1994, Pat. No. 5,495,940, which is a continuation of Ser. No. 929,276, Aug. 13, 1992, abandoned, which is a continuation-in-part of Ser. No. 889,598, May 26, 1992, abandoned, which is a continuation-in-part of Ser. No. 869,815, Apr. 16, 1992, Pat. No. 5,310,054.

[51] Int. Cl.⁶ ............................................. B65D 85/57
[52] U.S. Cl. .............................. 206/308.1; 206/232
[58] Field of Search .......................... 206/308.1, 308.3, 206/387.1; 220/335, 337, 338

[56] References Cited

U.S. PATENT DOCUMENTS

| | | | |
|---|---|---|---|
| 3,909,088 | 9/1975 | Dennehey et al. | 206/387.1 |
| 4,369,879 | 1/1983 | Egly et al. | 206/308.3 |
| 4,479,577 | 10/1984 | Eichner et al. | 206/308.3 |
| 4,867,302 | 9/1989 | Takahashi | 206/308.1 |
| 5,143,209 | 9/1992 | Boshek, Jr. | 206/387.1 |
| 5,495,940 | 3/1996 | Taniyama | 206/308.1 |

FOREIGN PATENT DOCUMENTS

| | | | |
|---|---|---|---|
| 229419 | 7/1987 | European Pat. Off. | 206/387.1 |
| 57-50363 | 3/1982 | Japan | 206/387.1 |
| 2-282062 | 11/1990 | Japan | 206/387.1 |

*Primary Examiner*—Jimmy G. Foster
*Attorney, Agent, or Firm*—William S. Frommer; Alvin Sinderbrand

[57] ABSTRACT

A storage container for mini-disk cartridge is described which includes a base tray, a cover and a disk tray. The base tray includes an inside bottom surface, a pair of side walls protruding upwardly from the bottom surface, a rear wall extending upwardly from the bottom surface, and is pivotally connected to the cover. The disk tray for receiving the mini-disk cartridge may have an open window or may have a floor, and rests within the base tray. The container can also be used without the disk tray by including extensions protruding upwardly from the bottom surface of the base tray to substantially surround the mini-disk cartridge.

5 Claims, 13 Drawing Sheets

STORAGE CONTAINER FOR MINI-DISK CARTRIDGES

CROSS-REFERENCE TO RELATED APPLICATION

This application is a continuation of application Ser. No. 08/392,204, filed Feb. 22, 1995, pending, which is a divisional of application Ser. No. 08/227,903 filed Apr. 15, 1994, now U.S. Pat. No. 5,495,940, which is a continuation of application Ser. No. 07/929,276 filed Aug. 13, 1992 abandoned, which is a continuation-in-part of application Ser. No. 07/889,598 filed May 26, 1992 abandoned, which is a continuation-in-part of application Ser. No. 07/869,815 filed Apr. 16, 1992, U.S. Pat. No. 5,310,054.

BACKGROUND OF THE INVENTION

1. Field of Invention

This invention relates to a storage case for disks. More specifically, this invention relates to a two or three-component transparent container in which information storage media, such as a mini-compact disk ("mini-CD") cartridges, may be packaged for retail sale and/or used for storage by the consumer.

2. Description of the Prior Art

Figure 29:
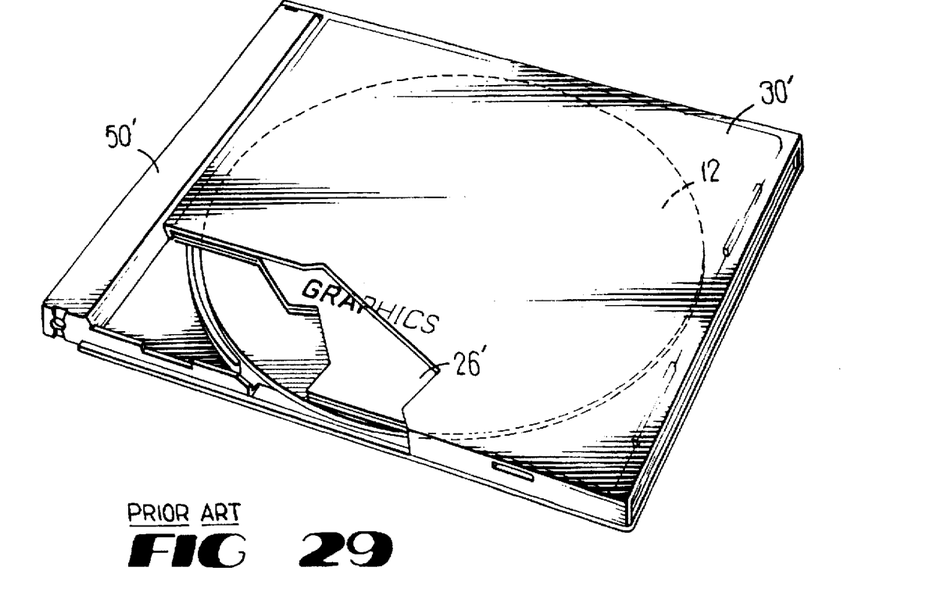
FIG. 29 is a top cut away perspective of a standard jewel box, with a mini-disk cartridge and a booklet.

As shown in FIG. 29, conventional storage containers for a standard compact disk 12 or the like are often called jewel boxes. The jewel box is usually made of transparent plastic and is rectangular in shape. Many such jewel boxes include three distinct components: a rectangular base tray 50', a corresponding rectangular cover 30', and a mounting hub (not shown). Usually, the base tray and cover are pivotally connected at their base corners to form a clam shell-like enclosure, and the mounting hub is inserted into the base tray.

The cover of the jewel box may have interior walls which correspond to the total height of the container. These walls may have several inwardly protruding tabs which are used to hold a promotional booklet or other identifying material 26' in a position where it can be viewed through the cover. When secured into place under the tabs, these articles usually cover the disk and act as a top view display.

The base tray of the typical prior art jewel box is determined to be slightly larger than a typical compact disk in all dimensions. In one type of jewel box, several tabs protrude from the interior walls of the base tray. The mounting hub is inserted into place on top of these tabs and a promotional card may be placed face down on the base tray's interior surface under the tabs. Installing the mounting hub on top of the card allows the consumer to readily identify the contents of the jewel box from both the bottom and the top of the package. The interior surface of the base tray may also include arced ribs which extend upwardly and surround the disk in a manner such that the cover is prevented from touching the disk. However, the location of the ribs makes them ineffective to protect the disk when a cover breaks as a result of force applied to it.

A conventional mounting hub for the above described jewel box is usually hollow and is formed of a central circular recess and a central circular mount. The mount holds the disk securely when the disk is inserted into the container. The recess allows the disk to rest easily in the container and also allows easy removal of the disk from the container.

Small cut-outs are usually formed on the side walls of the base tray and small matching extensions are correspondingly formed on the side walls of the cover. The fit between the cut-outs and the extensions usually causes enough interference to sustain the container in the normally closed position. The end of the cover usually extends slightly over the end of the base thereby allowing one to pry open the cover with one hand, while holding the container in the other hand.

Another prior art embodiment of the jewel box for standard compact disks incorporates only two components: the cover and the base tray. The base tray has the mounting hub molded into it. In order to compensate for not being able to insert a promotional card in the inside of the base tray, the bottom surface of this base try is recessed and several tabs protrude under the bottom surface from exterior walls of the base tray. This construction allows a card to be inserted on the outside of the container under the bottom surface of the base tray. This embodiment is less expensive to build than the conventional jewel box, since it is made up of only two components and uses less raw materials than the standard three-piece jewel box. However, the automated assembling processes, which include inserting the back promotional card onto the exterior of the base tray, are more expensive and time consuming when this type of box is employed. The increased cost of production occurs because the tabs and/or protruding side walls adjacent the recessed bottom of the surface of the base tray often get caught in the automatic machines. For this reason, the insert cards and disk are often inserted by hand or extra maintenance for the machine must be expended to keep the production line up and running.

Until recently, the standard Compact disk was the only size of optical disk employed for audio applications. However, today many recording companies are leaning towards using a smaller version of the standard compact disk, known as a mini-compact disk or mini-disk. The mini disk is permanently encased in a rectangular plastic enclosure (cartridge) and cannot be stored in an existing standard compact disk container. A need exists, therefore, for a container which can store and display a mini-disk cartridge and which can also be used in commercially available existing audio tape cassette and standard compact disk racks.

SUMMARY OF THE INVENTION

Accordingly it is an object of this invention to provide a container for mini-disk cartridges or the like Which may be used in existing audio tape cassette retail racks.

It is another object of this invention to provide a container for mini-disk cartridges or the like which may be used in existing standard compact disk retail racks.

It is yet another object of this invention to provide a container for mini-disk cartridges or the like which includes a means for identifying the enclosed disk from the bottom view of the container.

It is a further object of this invention to provide a container for mini-disk cartridges or the like, in which the bottom surface of the base tray is not recessed and include a means for identifying the enclosed disk from the bottom view of the container.

It is yet a further object of this invention to provide a container for mini-disk cartridges, which includes a means for limiting the motion of the cover.

It is another object of this invention to provide a container for mini-disk cartridges, which keeps the base tray and cover more securely together when in the closed position.

These and other objects are achieved by the container of the present invention. In one preferred embodiment, the container is made up of three main components, a base tray, a cover, and a disk tray. The base tray is pivotally connected to the cover, and the disk tray is inserted into the base tray. The container has dimensions in which the width is slightly larger than the width of a typical mini-disk cartridge, and the length and the height are approximately the same length and height of a standard audio tape cassette case. By incorporating a container with the same length and height as a standard audio tape cassette case, the container may be used in already existing audio tape cassette retail racks.

The cover of this embodiment has two parallel side walls which define the height of the container. One or more tabs protrude inwardly from each of these walls. The tabs are used to secure a thin promotional booklet or any other materials against the inside top surface of the cover. The tabs may be rectangular, circular, or almost any other shape. However, a preferred shape is a half sphere, which is squared off on the edge closest to the enclosed materials. When inserted into place, the promotional material may cover the entire mini-disk cartridge from the top view. Even if promotional material is not enclosed within the cover, by inserting the mini-disk cartridge into the container with the label side face-up, the consumer may readily identify the enclosed mini-disk via the top view through the cover.

The base tray and the cover are pivotally connected with a small depression in the rear of each base tray side wall that correspondingly mates with a small protrusion in the rear of each cover side wall. An annular slot formed below, above, or on either side of the depression in at least one base tray side wall may be used in conjunction with a small protrusion in the rear of the cover side wall. The annular slot and protrusion are matingly matched such that the cover's motion range is limited to a specific angle. A preferred angle is 180 degrees because it further insures that the material inserted into the cover does not fall out when the container is in the open position. For this angle, the annular slot extends the length of a semi-circle.

The base tray of the above embodiment has at least two parallel walls. These walls may have cut outs corresponding to the tabs in the cover, thereby providing a recess in which the cover tabs may rest when the container is in the closed position.

On at least one of the parallel side walls of the basetray, there is at least one small depression that correspondingly matches a small protrusion that extends from an interior portion of at least one side wall of the cover. The depression and matching protrusion secure the container in the closed position. It has been found that as the depression and corresponding protrusion are positioned closer to the front of the container, the leverage used to open the container is decreased. Therefore, the container is kept more securely shut when it is in the closed position and is harder to jar open.

On at least one of the parallel side walls of the base tray, there is also is least one small depression that correspondingly matches at least one small protrusion that extends from an exterior portion of at least one side wall of the disk tray. The depression and matching protrusion secure the disk tray when it is inserted into the base tray.

An interior front wall, which is located opposite the hinged portion, is slightly recessed such that the front end of the cover extends over it. Thereby, one is able to pry open the cover with one finger while holding the container in place with the other hand.

The disk tray of this first configuration has a rimmed center opening with a floor having dimensions slightly larger than the length and the width of a mini-disk cartridge. A stepped standoff attached to the floor in at least two of its corners allow the disk to rest comfortably and securely. The back wall of each standoff can be heightened and the step of each standoff can be shortened to better capture the side edges Of the mini-disk cartridge. A ramp extending the height of the step may also be incorporated into the standoffs to create a sliding surface for situations when the disk is improperly inserted.

On at least one side of the rimmed center opening is a finger insert recession, which allows one to easily retrieve the mini-disk cartridge. The rear rim of the center opening acts as a rest for the cover when the container is the closed position.

The side walls of the disk tray may have cut outs which line up with the cut outs in the base tray and correspond to the tabs in the cover. Thereby, a recess is created, in which the cover tabs may rest when the container is in the closed position.

Promotional material facing downward may be inserted into the base tray before the disk tray is inserted, and the disk may be inserted with its label facing upward or downward. When the container is in the closed position, the consumer can easily identify the contents from the bottom view by way of the promotional material, and may identify the contents of the container from the top view by way of additional promotional material inserted under the cover's tabs or via the mini-disk cartridge's label. Further, the Contents of the container may also be identified via an index or a tab by inserting it within the interior of the rear wall.

In a second configuration, the disk tray has a step attached to the disk tray's floor in at least two of its corners. Preferably, at least one side wall of the center opening has a small cut out, which allows the center opening to flex so that when a mini-disk cartridge is inserted into the disk tray, it is held securely in place. For this embodiment, the mini-disk cartridge and promotional material may be inserted in much the same way as described for the first configuration.

In a third configuration, the disk tray has unstepped standoffs attached to the floor of the disk tray in at least two of its corners. Again, this embodiment may be utilized with the mini-disk cartridge and promotional material as described in the first configuration. However, in this embodiment, the surface of the mini-disk cartridge rests against the floor of the disk tray.

In a fourth configuration, the disk tray's center opening has a window opening instead of a floor. Preferably, at least one corner of the center opening has a small cut out, which allows the sidewalls of the center opening to flex, such that the mini-disk cartridge may rest comfortably and securely.

In a first arrangement utilized with this fourth configuration, the mini-disk cartridge may be inserted into the disk tray with its label facing downward, and a booklet or other promotional material may be inserted within the cover under the tabs. When the container is in the closed position, the consumer can easily identify the contents of the container from the top-view, and can readily view additional information on the diesk's label from the bottom-view. In a second arrangement, the mini-disk cartridge and promotional material may be inserted as discussed in the first configuration.

In a fifth configuration, the disk tray with the floor attached to its center opening does not have a stand off or a step molded to its surface. Rather, it simply utilizes a cut out in at least one side wall of the center opening to secure the mini-disk cartridge.

In a sixth configuration, the three component container having the disk tray with the center opening window may have a mounting hub, corresponding to the central opening of the disk, formed integrally with a bottom surface of the base tray. The hub is used to provide added assurance that the mini-disk cartridge remains secure within the container. For this configuration, the mini-disk cartridge and promotional material may be inserted and applied in much the same way as the first arrangement of the fourth configuration or the first configuration.

In a seventh configuration, the three component container having the disk tray with a floor attached to the bottom of the center opening may have a mounting hub, corresponding to the central opening of the mini-disk cartridge, formed integrally with a bottom surface of the disk tray. Again, the hub is employed for added stabilization of the mini-disk cartridge within the container. For this embodiment, the mini-disk cartridge and promotional material may be inserted and applied as described for the first configuration.

In an alternative embodiment, the container is made up of two main components, a base tray and a cover. Four raised rims are formed integrally with a bottom inside surface of the base tray. The raised rims substantially surround the mini-disk cartridge, such that the mini-disk cartridge rests comfortably and securely without the need for a distinct disk tray. The rear raised rim acts as a rest for the cover when the container is in the closed position. The mini-disk cartridge may be inserted within the raised rims with its label facing down, and a booklet or other promotional material may be inserted within the cover to allow the consumer to readily identify the contents of the container from the top and bottom views.

BRIEF DESCRIPTION OF THE DRAWINGS

The accompanying drawings illustrate several presently preferred but nevertheless illustrative embodiments of the invention, and serve to aid in the explanation of the principles of the invention.

DETAILED DESCRIPTION OF ILLUSTRATIVE EMBODIMENTS

As shown in FIGS. 1 through 10, in a first embodiment of the invention, a storage container 10 is preferably formed of a transparent, plastic material. The container 10 includes three components, a base tray 50, a cover 30, and a disk tray 25. Though the dimensions of the container 10 may vary to adapt to different sized mini-disk cartridges (or other six-sided, three-dimensional objects, generally referred to as "hexahedrons"), a preferred embodiment is designed for a typical mini-disk cartridge 13 in which an optical disc is encased in a rectangular enclosure. The width of the container 10 is approximately 91 millimeters, the length is approximately 109 millimeters and the height is approximately 15 millimeters. (see FIG. 4). The width is designed to be slightly longer than the width of a minidisk cartridge 13, while the length and height are employed to allow the container 10 to be utilized in already existing retail racks for standard audio tape cassette containers. In another embodiment, the length, the height, and the width of the container 10 may have varying dimensions to adapt the container 10 for use in already existing retail racks for standard size compact disk containers.

Figure 1:
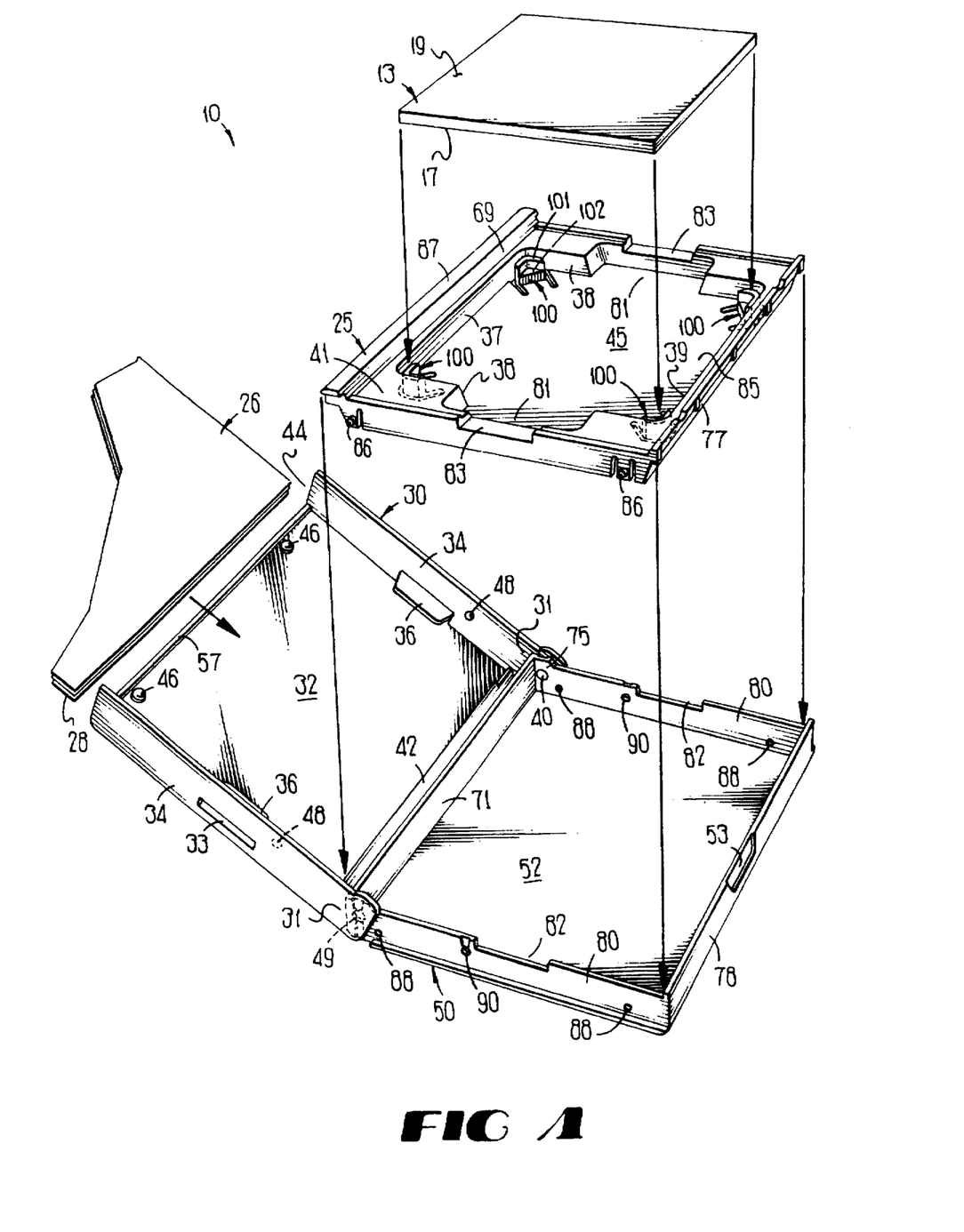
FIG. 1 is an exploded perspective view of the container in the open position, with the disk tray having a floor with stepped standoffs, a mini-disk cartridge and a booklet ready for insertion.

The cover 30 includes two side walls 34 which extend perpendicularly from a top inside surface 32. From each side wall 34 one or more side tabs 36 protrude inwardly. The side tabs 36 are positioned a sufficient distance from the top inside surface 32 to allow for the insertion of a booklet or card 26 between the side tabs 36 and the top inside surface 32. A small cut out 33 is formed in the center of at least one side wall 34 but preferably both, between the side tabs 36 and the top inside surface 32. The cut out 33 improves the efficiency in the molding process, as well as serving other functions.

A booklet or card 26, with its graphics side 28 facing the cover's top surface 32 (see FIG. 4), may be inserted within the cover 30 at the open front end 44 of the cover 30 and slid under the tabs 36 until it rests against a rear wall 42 of the cover 30. The front edge of the cover 30 also has an upwardly protruding front lip 57, which extends the length of the entire front edge.

Figures 5, 6:
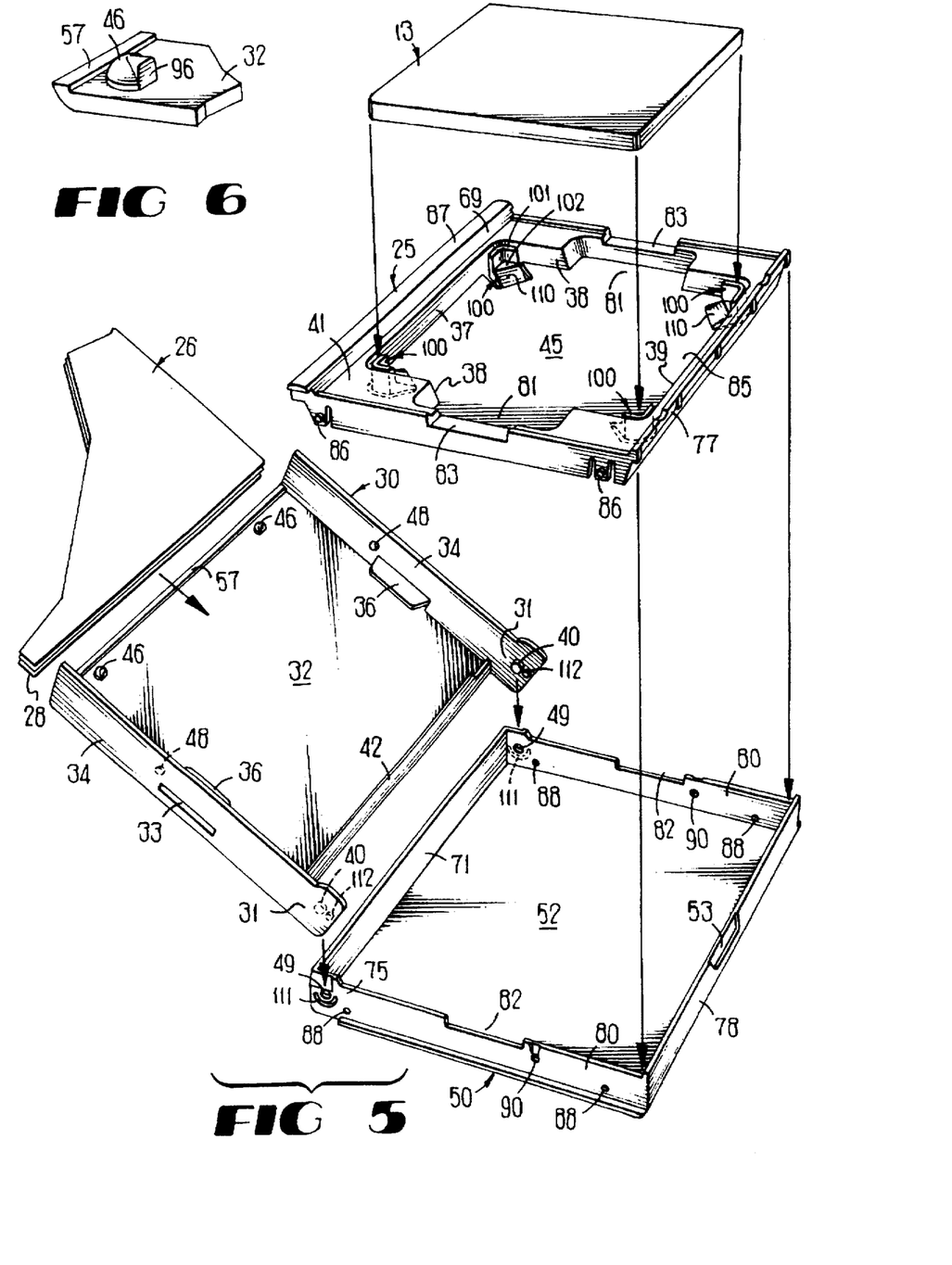
FIG. 5 is an exploded perspective view of the container with a motion limiting slot and the disk tray having a floor with stepped standoffs, a mini-disk cartridge and a booklet ready for insertion.
FIG. 6 is an isolated perspective view of a portion of the cover with half spherical tabs having squared edges.

At least one small front tab 46, but preferably two, protrudes upwardly from a portion of the inside surface of the cover 30 adjacent the open front end 44 of the cover 30 to keep the booklet or card 26 in place once it rests against the cover's rear wall 42. The front tabs 46 may be almost any shape, including rectangular, circular, and spherical. As shown in FIG. 6, the cover's front tabs 46 can be spherical with a squared off edge 96. The squared off edge 96 is positioned on the side closest to the booklet or card 26 and may extend from the top of the spherical tab 46 to the cover's top inside surface 32. It is utilized to better secure the booklet or card 26 by providing a flat surface for its edge to rest against.

Again referring to FIGS. 1 through 10, at least one side wall 34, but preferably both, also has a capture protrusion 48 extending inwardly. The rear end 31 of each of the cover's side walls 34 has a pivot protrusion 40 extending inwardly.

The base tray 50 includes a pair of side walls 80, a front wall 78, and a rear wall 71, which extend perpendicularly from a bottom inside surface 52. Each side wall 80 has notches 82, which correspond in position to the tabs 36 of the cover 30. At least one side wall 80, but preferably both, has a cover capture dimple 90, which correspondingly matches the capture protrusion 48 extending from the cover 30. At least one side wall 80, but preferably both, also has a disk tray capture dimple 88 on both sides of the side wall notch 82. Each base tray side wall 80 has a pivot depression or hole 49 in the exterior portion of its rear end 75, which corresponds to the pivot protrusion 40 on the cover 30. The depression may extend partially into or fully through the rear end 75 of the side wall 80. The exterior of the base tray's front wall 78 has a slightly recessed area 53, preferably in its center.

The disk tray 25 has a rear wall 69, a front wall 77, and a rimmed center opening 85 having dimensions slightly larger than the length and the width of a mini-disk cartridge 13. The rimmed center opening 85 is made up of a rear rim 37, two side rims 38, a front rim 39, and a floor 45, which is attached to the bottom edges of the rims 37, 38 and 39.

Positioned at least two corners of the floor 45, but preferably at all four corners, are stepped standoffs 100 protruding upwardly from the top surface of the floor 45. Each standoff 100 has a back 101, which is adapted to substantially surround the corner side edges of a mini-disk cartridge 13. Each standoff 100 also may have a step 102, which supports the corner bottom or top edges of mini-disk cartridge 13 in a position away from the floor 45. The height of the step 102 allows the user to slide the tip of his finger under the mini-disk Cartridge 13 to facilitate its removal from the container 10. Therefore, the taller the step 102, the easier it is for the user to remove the mini-disk cartridge 13 from the container 10. Preferably, the back 101 of each standoff 100 extends approximately one eighth of an inch above the floor 45, and the step 102 of each standoff 100 extends approximately one sixteenth of an inch above the floor 45. These heights may vary, however.

Each side rim 38 has a notch 83 on its exterior, which corresponds in position to the base trays notches 82 and the cover's side tabs 36. At least one side rim 38, but preferably both, has a finger insert 81 formed in its interior, which preferably is centered between the corners of the center opening 85. The exterior of each side rim 38 also has capture protrusions 86 located on both sides of the side wall notches 83, which correspond to the capture dimples 88 of the base tray 50.

Molded to the top of the rear wall 69 of the disk tray 25 is a rear ledge 87, which extends across the pivot region of the base tray 50. The rear ledge 87 is supported by at least one, but preferably three structural ribs 35 (see FIG. 15). Molded to the bottom of the rear wall 69 and the top of the rear rim 37 is a rear cover support 41, which serves as a rest for the cover's rear wall 42 when the container 10 is in the closed position.

The base tray 50 and the cover 30 are attached by mating the cover's pivot protrusions 40 with the base tray's pivot depressions 49. The base tray's front wall 78 and the cover's front lip 57 rest against each other when the container 10 in the closed position, and the friction they create helps keep the container 10 securely closed. The base tray's front wall 78 is slightly recessed so that the cover's front lip 57 extends over it to allow one to pry open the cover 30 with a finger while holding the container 10 in the other hand. The slightly recessed area 53 on the exterior of the base trays front wall 78 may be utilized as a finger grip when opening the container. The cover 30 rotates about an axis centered horizontally through the length of the rear wall 71.

The disk tray 25 is attached to the base tray 50 by inserting the disk tray's capture protrusions 86 into the base tray's disk tray capture dimples 88. When the disk tray 25 is inserted, its front wall 77 rests flush against the base tray's front wall 78, and the exterior of each disk tray side rim 38 rests flush against the interior of each base tray side wall 80. The disk tray's rear ledge 87 rests on top of the base tray's rear wall 71.

Figure 2:
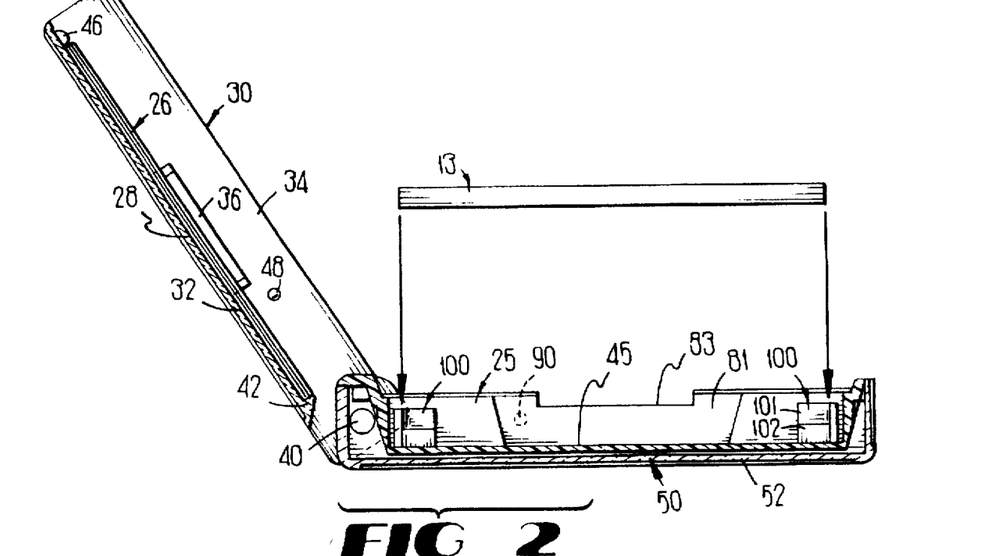
FIG. 2 is a cross-sectional side view of the container of FIG. 1 in the open position, with a mini-disk cartridge ready for insertion into the disk tray having a floor with stepped standoffs.

As shown in FIG. 2, promotional material 27 may be inserted facing downward under the disk tray 25. A mini-disk cartridge 13 may be placed in the container 10 in the disk tray's center opening 85 of the disk tray 25 and a booklet or card 26 may be securely inserted under the cover 30. The mini-disk cartridge 13 may be inserted into the disk tray 25 with its non-label side 19 or its label side 17 facing the cover 30.

Figure 3:
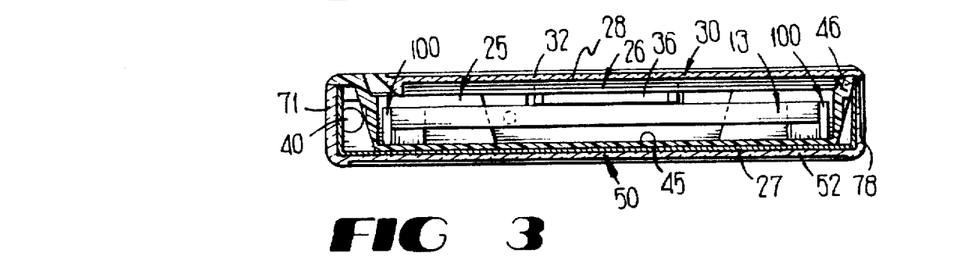
FIG. 3 is a cross-sectional side view of the container of FIG. 1 in the closed position, with a mini-disk cartridge inserted into the disk tray having a floor with stepped standoffs.
Figure 4:
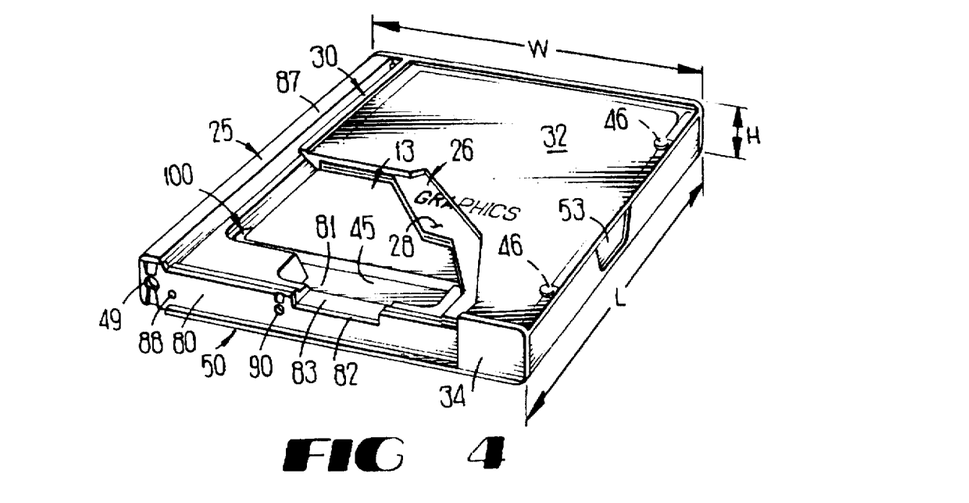
FIG. 4 is a top cut away perspective view of the container FIG. 1 in the closed position, with the disk tray having a floor with stepped standoffs, a mini-disk cartridge and a booklet.

As shown in FIG. 3, the corners of the mini-disk cartridge 13 rest on the steps 102 of the standoffs 100. The promotional material 27 may be bent such that it rests against the interior of the front wall 78 and rear wall 71 so that information or graphics may be displayed. Further, as shown in FIG. 4, the booklet or card 26 can be readily seen through the cover's transparent top surface 32.

As shown in FIG. 5, an annular slot 111 may be formed in the rear end 75 of one or both of the base tray's side walls 80 below the base tray's pivot depression 49. The annular slot 111 preferably extends partially into the side wall 80, though it may extend fully through the side wall 80. A motion limiting protrusion 112 corresponding in position and size to the annular slot 111 may be formed to extend inwardly on the rear ends 31 of one or both of the cover's side walls 34 below the cover's pivot protrusion 40. When the motion limiting protrusion 112 is matingly engaged with the annular slot 111, the motion of the cover is limited to 180 degrees due to the circumference of the annular slot 111 being a semi-circular. The 180 degrees motion limitation is preferred because it further insures that the material in the cover 30 does not fall out when then container is in the open position. However, the length of the annular slot 111 may be shortened or lengthened to create different cover 30 motion limitations. Further, the annular slot 111 and motion limiting protrusion 112 may be placed in different positions around the pivot region of the container to create various motion limiting ranges, as long as the annular slot 111 and motion limiting protrusion 112 are positioned such that they can be mated when the cover 30 and base tray 50 are pivotally connected.

Figure 7:
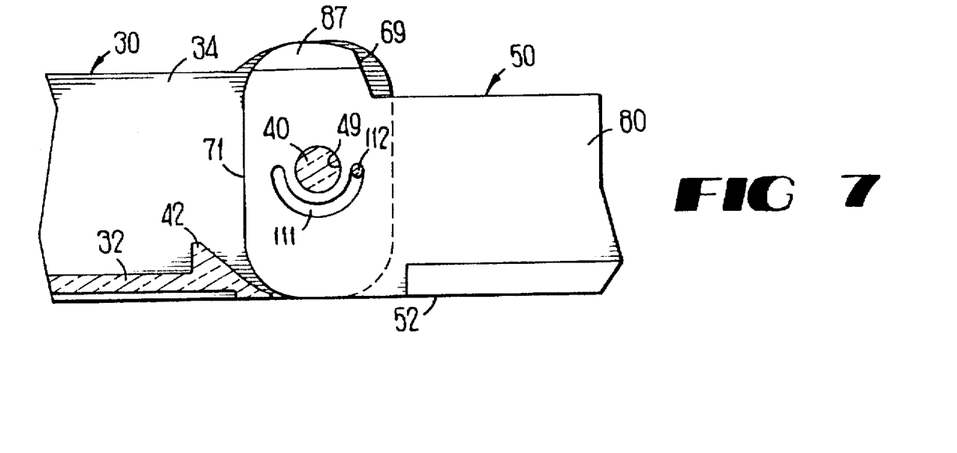
FIG. 7 is an isolated cross-sectional view of the container with the motion limiting slot in the 180 degree open position.
Figure 8:
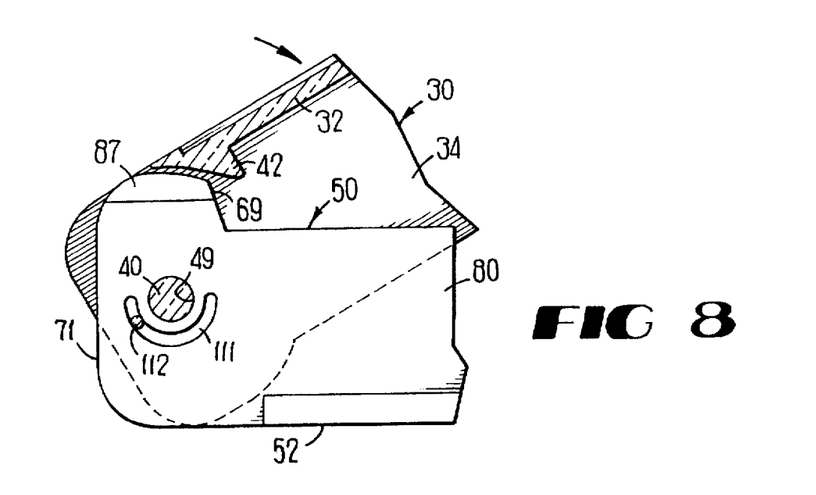
FIG. 8 is an isolated cross-sectional view of the container with the motion limiting slot in the approximately 30 degree open position.
Figure 9:
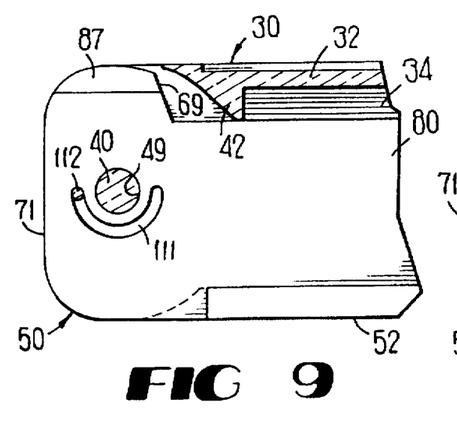
FIG. 9 is an isolated cross-sectional view of the container with the motion limiting slot in the zero degree closed position.
Figure 10:
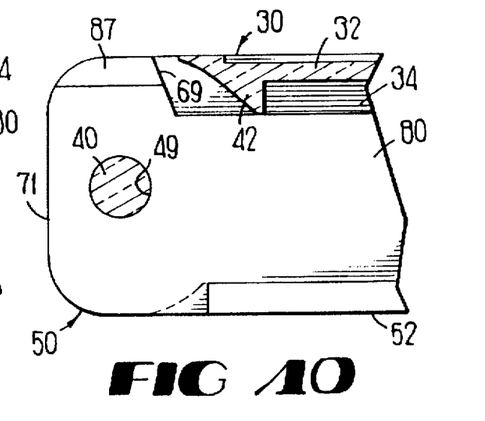
FIG. 10 is an isolated cross-sectional view of the container without the motion limiting slot in the closed position.

FIG. 7 shows the placement of the motion limiting protrusion 112 within the annular slot 111 when the cover 30 has pivoted 180 degrees, while FIG. 8 shows the protrusion 112 when the cover has pivoted approximately 30 degrees from the closed position. FIG. 9 shows what the protrusion and annular slot ill look like when the container is closed and the cover's pivot position is zero degrees. As shown in FIG. 10, this can be compared to a container 10 without the protrusion 112 and annular slot 111. Also, as shown in FIG. 9 as compared to FIG. 10, the ga p between the cover's rear wall 42 and the disk tray's rear wall 69 may be shortened to cover more of the rear edge of the mini-disk cartridge 13.

As shown in FIG. 5, the cover's capture protrusion 48 and the corresponding base tray capture dimple 90 may be positioned closer toward the front of the container 10. By moving the capture protrusion 48 and capture dimple 90 closer toward the front of the container 10, the leverage used to open the container is decreased. The decrease in leverage allows the cover 30 and the base tray 50 to stay together more securely when the container 10 is in the closed position such that it becomes harder to jar open.

The height of one or more of the standoff's backs 101 may be lengthened to capture more of the side edge of the mini-disk cartridge 13, which gives added assurance that the disk will remain securely seated. The height of one or more of the standoff's steps 102 may also shortened to allow the standoff's back 101 to be lengthened even more. A ramp 110 may also be formed to one or more of the standoff's steps 102, which may extend inwardly from the top of a step 102 to the disk tray's floor 45. However, the ramp 110 may be formed starting at any position on the step 102 such as the middle region. The ramp 110 gives added assurance that the mini-disk cartridge 13 will not be damaged in the instance that it is incorrectly inserted or dropped into the container 10 by allowing the mini-disk cartridge 13 to slide rather than fall off the step 102.

Figure 11:
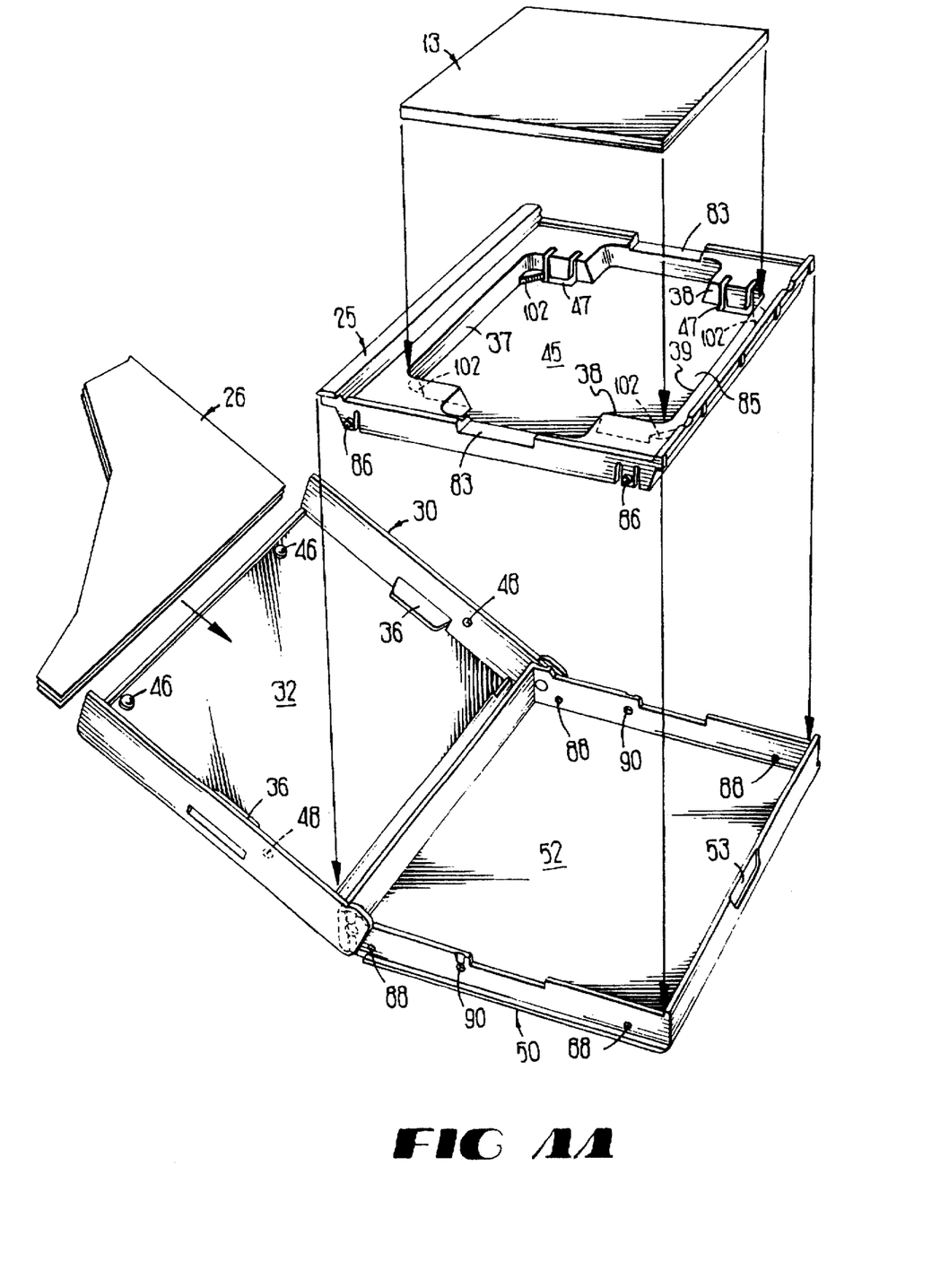
FIG. 11 is an exploded perspective view of the container in the open position, with the disk tray having a floor with steps, a mini-disk cartridge and a booklet ready for insertion.

In a second configuration, as shown in FIG. 11, at least two corners of the floor 45, but preferably all four, have a step 102 formed to its top surface. Preferably, at least one side rim 38 has a small cut out 47 to allow the disk tray 25 to be more flexible in securing the mini-disk cartridge 13. The rear rim 37 and front rim 38 may also have cut outs 47.

Figure 12:
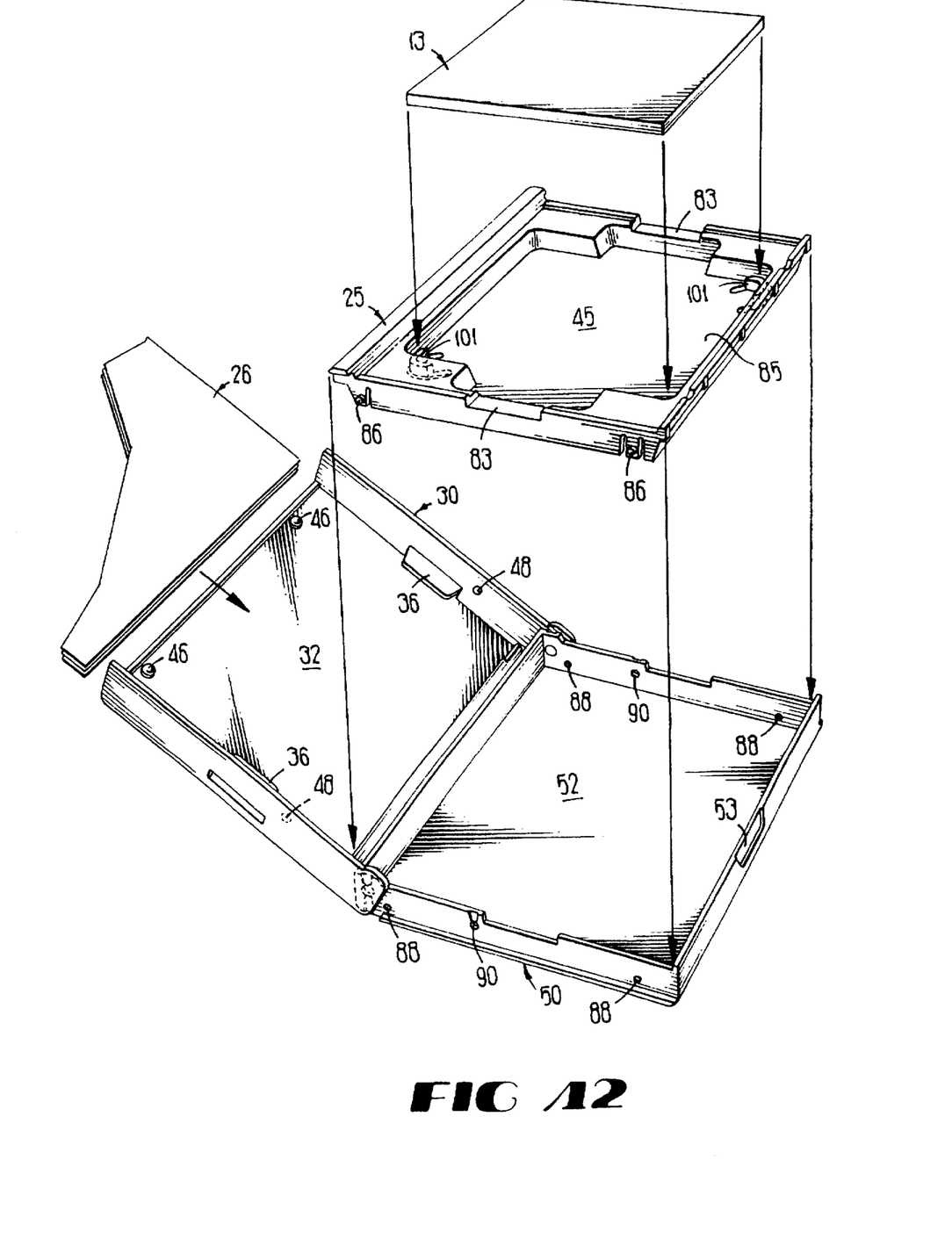
FIG. 12 is an exploded perspective view of the container in the open position, with the disk tray having a floor with standoff backs, a mini-disk cartridge and a booklet ready for insertion.

In a third configuration, as shown in FIG. 12, at least two corners of the floor 45 have a standoff back 101 formed to their top surface. Like the first configuration, each standoff back 101 substantially surround the corners of the mini-disk cartridge 13. However, in this configuration the bottom surface of the mini-disk cartridge 13 rests flush against the floor 45 of the disk tray 25.

Figure 13:
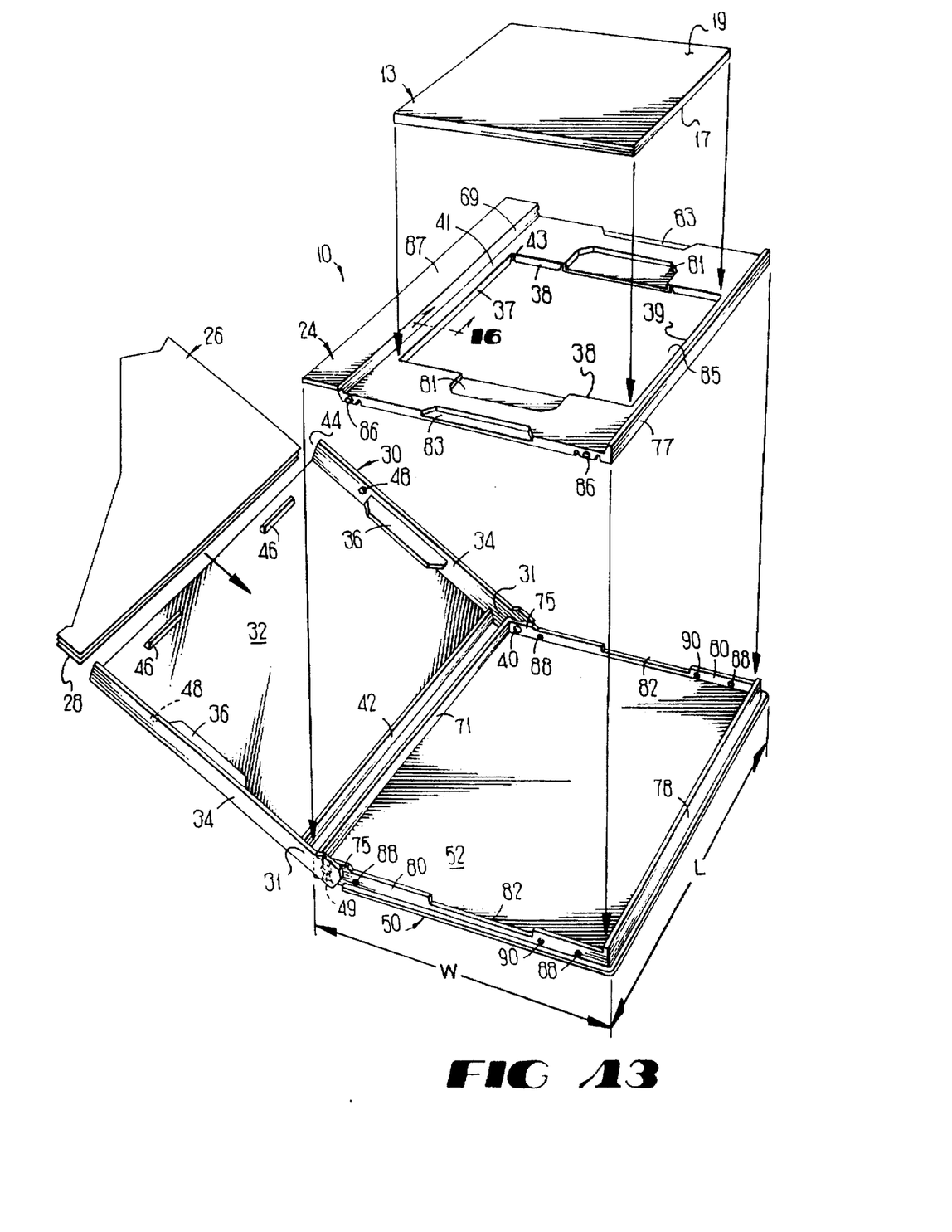
FIG. 13 is an exploded perspective view of the container in the open position, with the disk tray having a window, a mini-disk cartridge and a booklet ready for insertion.

In a fourth configuration, as shown in FIG. 13, the rimmed center opening 85 of the disk tray 24 may be utilized without a floor 45. The rims 37, 38 and 39 are flexible and meet at cut out corners 43, to form a window-like opening.

Figure 14:
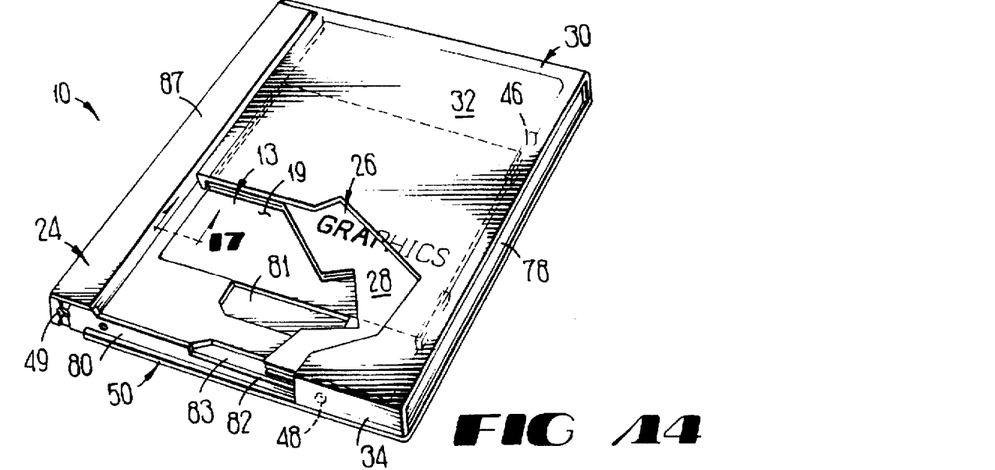
FIG. 14 is a top cut away perspective view of the container of FIG. 13 in the closed position, with the disk tray, a mini-disk cartridge and a booklet.
Figure 15:
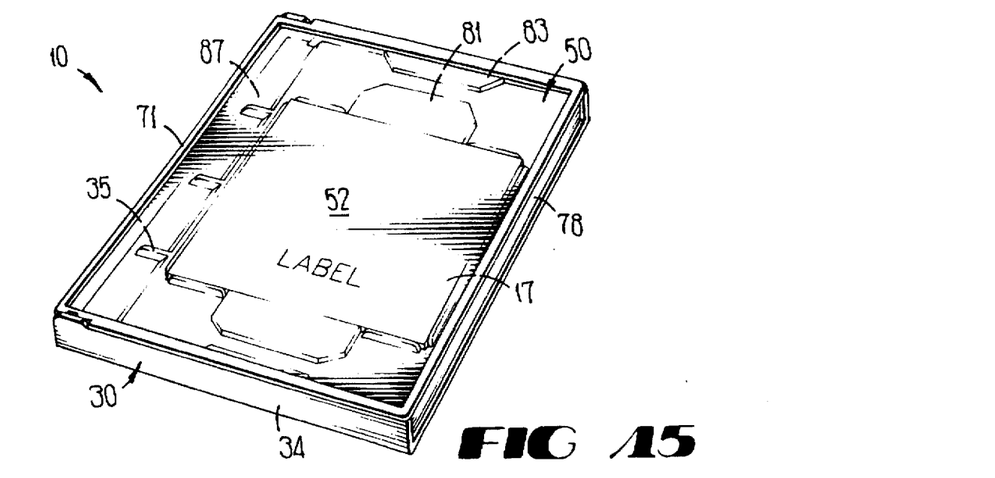
FIG. 15 is a bottom perspective view of the container of FIG. 13 in the closed position, with the disk tray and a mini-disk cartridge.
Figure 16:
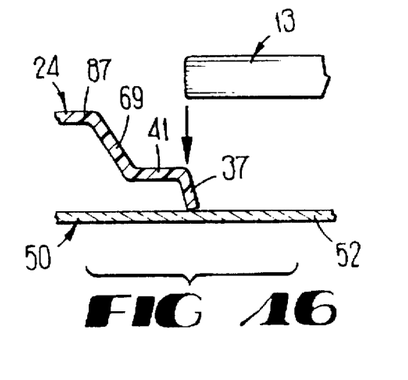
FIG. 16 is a cross-sectional side view of the container in the open position along line 16 in FIG. 13, with a mini-disk cartridge ready for insertion into the disk tray having a window.
Figure 17:
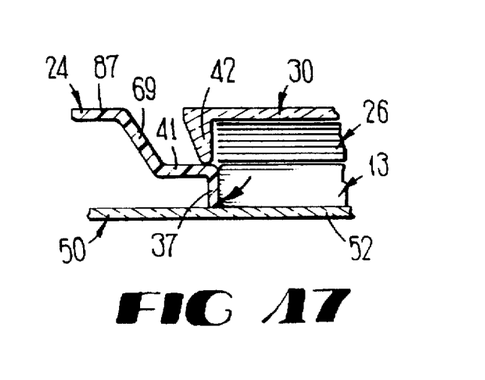
FIG. 17 is a cross-sectional side view of the container in the closed position along line 17 in FIG. 14, with a mini-disk cartridge and a booklet inserted.

As shown in FIG. 14, a mini-disk cartridge 13 may be placed in the container 10 in the disk tray's center opening 85 of the disk tray 24. A booklet or card 26, or the label-side 17 of the mini-disk cartridge 13 may be readily viewed through the cover's transparent top 32. However, as shown in FIG. 15, when promotional material 27 is not inserted under the disk tray 24, the label-side 17 of the mini-disk cartridge 13 may be inserted facing downward. This allows the consumer to view the mini-disk cartridge's label 17 through the base tray's transparent bottom surface 52.

As best shown in FIGS. 14 through 17, when the mini-disk cartridge 13 is inserted, the bottom portion of the flexible rims 37, 38 and 39 flex outward to encompass and secure the mini-disk cartridge 13. When the container 10 is in the closed position, the cover's rear wall 42 rests on top of the disk tray's rear cover support 41.

Figures 18, 19, 20:
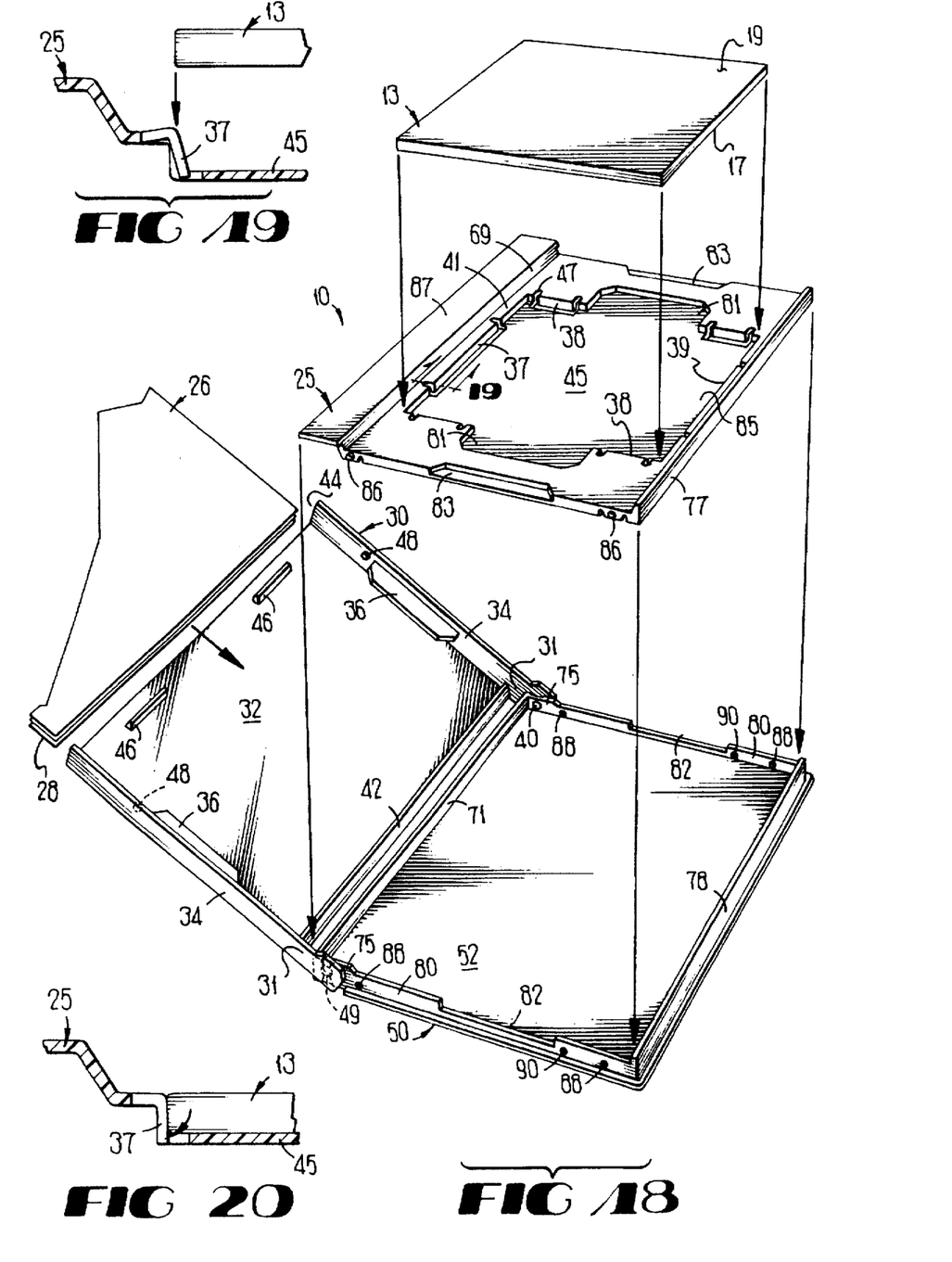
FIG. 18 is an exploded perspective view of the container in the open position, with a disk tray having a floor, a mini-disk cartridge and a booklet ready for insertion.
FIG. 19 is a cross-sectional side view of the container in the open position along line 19 of FIG. 18, with a mini-disk cartridge ready for insertion into the disk tray having a floor.
FIG. 20 is a cross-sectional side view of the container in the open position along line 19 in FIG. 18 with a mini-disk cartridge and a booklet inserted into the disk tray having a floor.

In a fifth configuration, as shown in FIG. 18, the disk tray 25 is substantially similar to the disk tray 24 in FIG. 13. However, this disk tray 25 has a floor 45 attached to the bottom of the center opening 85. The rear rim 37, the two side rims 38, the front rim 39, and the finger inserts 81 have rigid bottom portions to support the floor 45. Also, instead of cut out corners 43 (See FIG. 13), this disk tray 25 has at least one side cut out 47, but preferably two, located on the interior of the side rims 38 on each side of the finger inserts 81 and on the interior of the rear rim 37 and the front rim 39. As shown in FIGS. 19 and 20, when the mini-disk cartridge 13 is inserted, the rims 37, 38 and 39 surround the mini-disk cartridge 13 to ensure that it rests comfortably and securely.

Figures 21, 22:
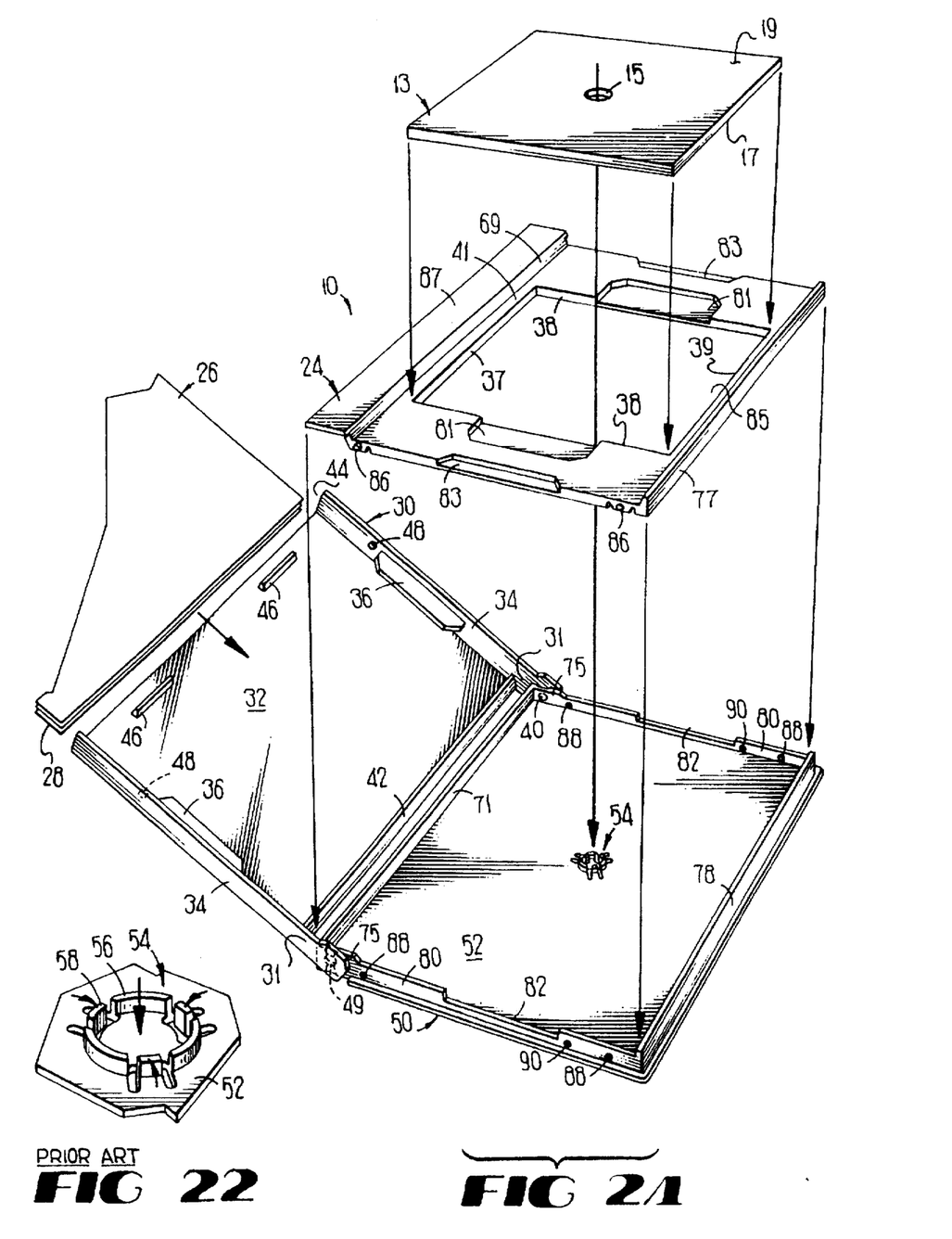
FIG. 21 is an exploded perspective view of the container in the open position, having a mounting hub in the base tray, with the disk tray having a window, a mini-disk cartridge and a booklet ready for insertion.
FIG. 22 is a top perspective view of the mounting hub.

In a sixth configuration, as shown in FIG. 21, the cover 30, and the disk tray 24 with the center opening 85 may be used in conjunction with a base tray 50 having a circular mounting hub 54 formed integrally with its bottom surface 52. The mini-disk cartridge 13, via its center hole 15, may be mounted on top of the mounting hub 54. As shown in FIG. 22, the mounting hub 54 has a raised circular mount 56 and raised fingers 58. The mounting hub 54 gives added assurance that the mini-disk cartridge 13 will remain secure within the container 10.

Figure 23:
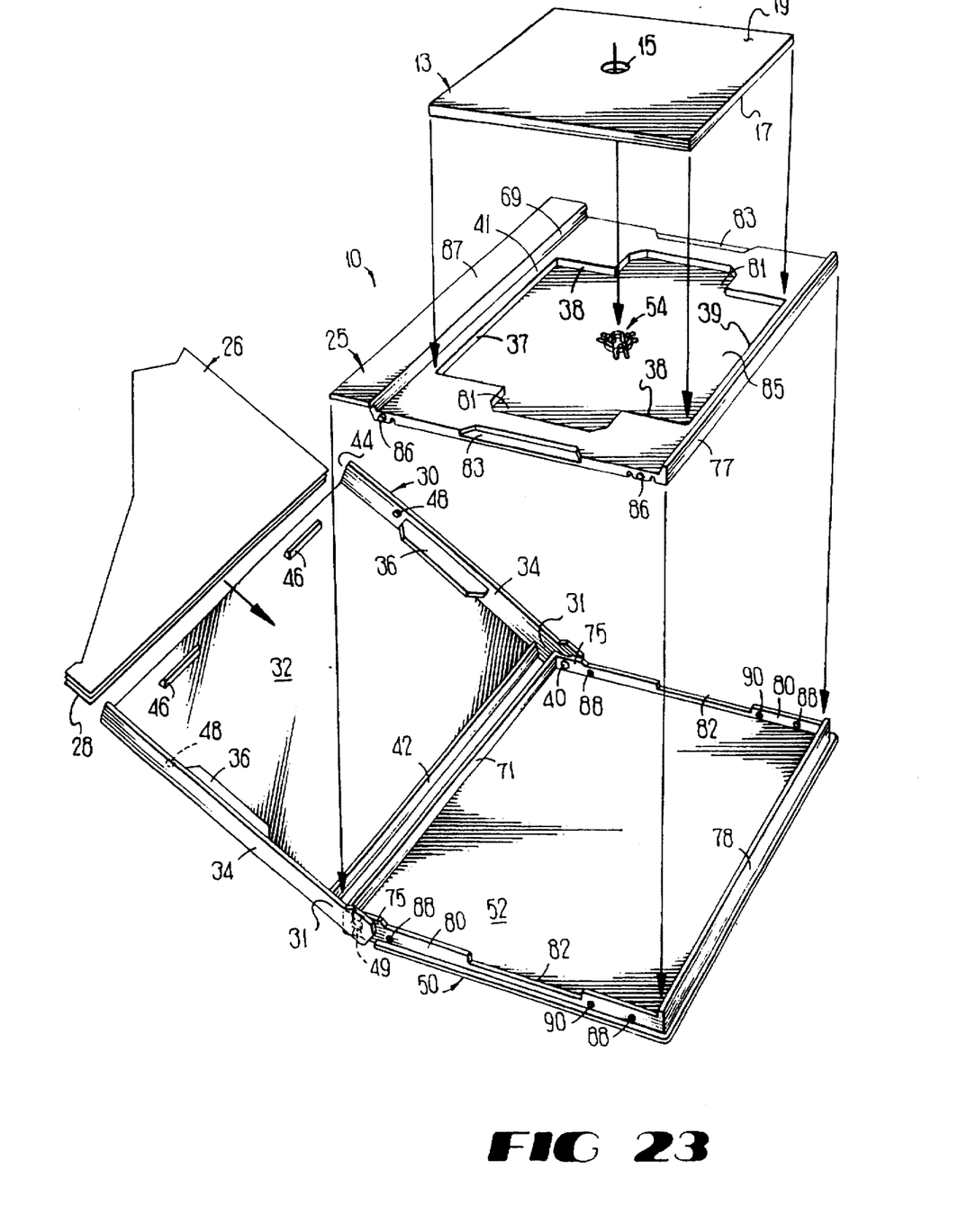
FIG. 23 is an exploded perspective view of the container in the open position with the disk tray having a floor and a mounting hub, a mini-disk cartridge and a booklet ready for insertion.

In a seventh configuration, as shown in FIG. 23, the disk tray with a floor 25 may have a circular mounting hub 54 formed integrally to the center of the floor 45. Again, the mounting hub 54 reassures that the mini-disk cartridge 13 remains secure inside the container 10.

Figure 24:
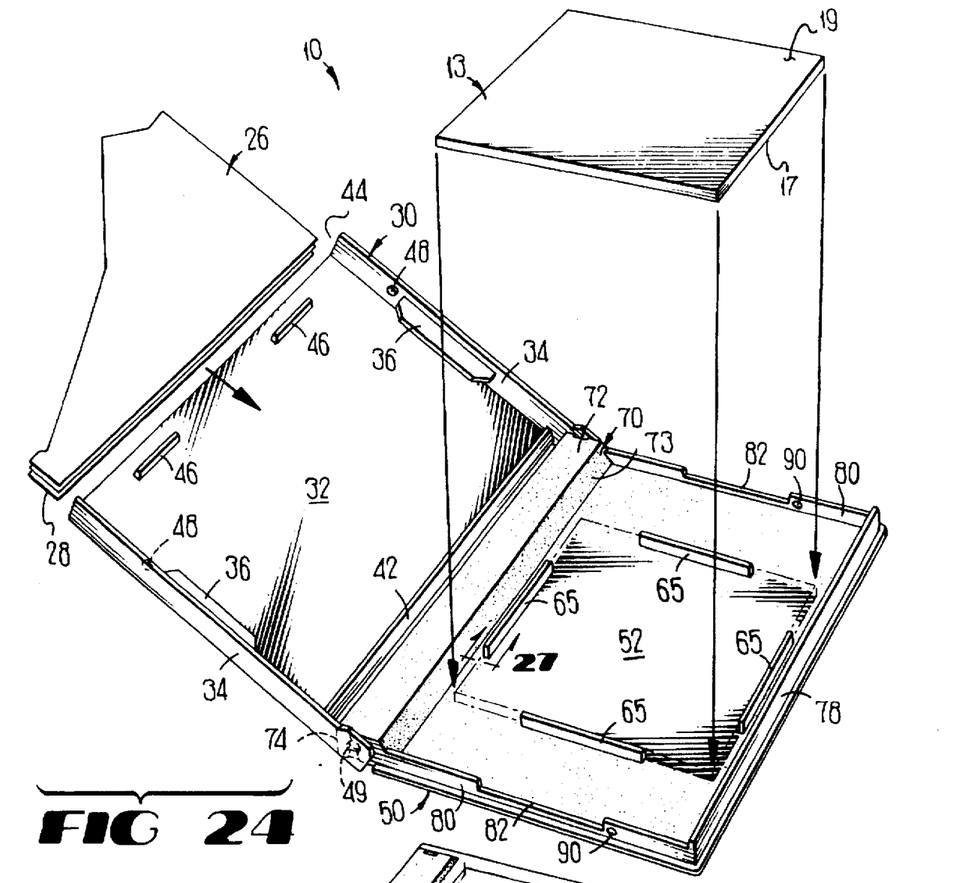
FIG. 24 is an exploded perspective view of the container having rims in the base tray in the open position, with a mini-disk cartridge and a booklet ready for insertion.

In another embodiment, as shown in FIG. 24, the container 10 is formed of two main components, a base tray 50 and a cover 30. The base tray 50, the cover 30, and the dimensions of the container 10 in this embodiment are substantially the same as the base tray 50, the cover 30 and the dimensions for the fourth configuration. (See FIG. 13).

The base tray 50 has four flexible raised rims 65 formed integrally with its bottom surface 52. The raised rims 65 protrude upward and substantially surround the mini-disk cartridge 13 to ensure that is rests comfortably and securely. Though other placements of the rims may be used, at the present time, the optimum distance between each pair of parallel opposing rims seems to be 0.2 mm less than the length and the width of the mini-disk cartridge 13. When the mini-disk cartridge 13 is inserted, the rims flex outward and create enough interference to allow the mini-disk cartridge 13 to rest comfortably and securely. The base tray's rear wall 70 is made up of an inner rear wall 73, and outer rear wall 74, and a top rear wall 72. Unlike the base tray 50 of the preferred embodiment, this base tray 50 does not have disk tray capture dimples 88 in its side walls 82, as shown in FIG. 13.

Figure 25:
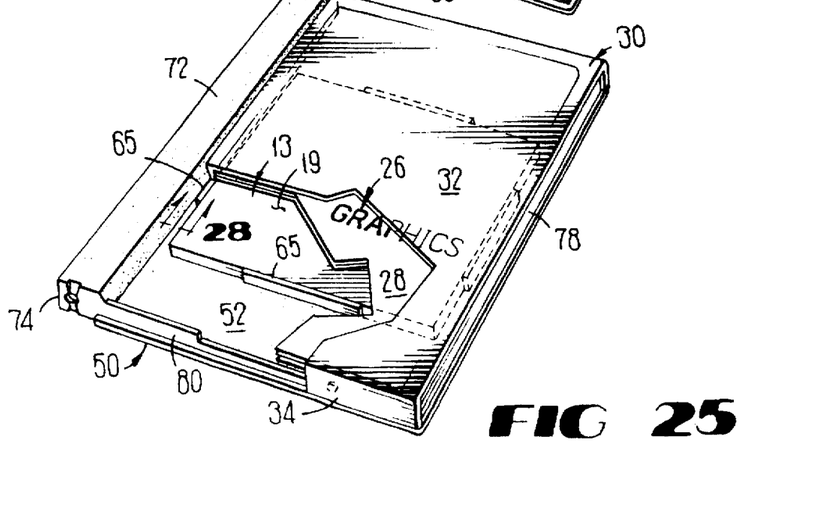
FIG. 25 is a top cut away perspective view of the container of FIG. 24 in the closed position, having rims in the base tray with a mini-disk cartridge and a booklet.
Figure 26:
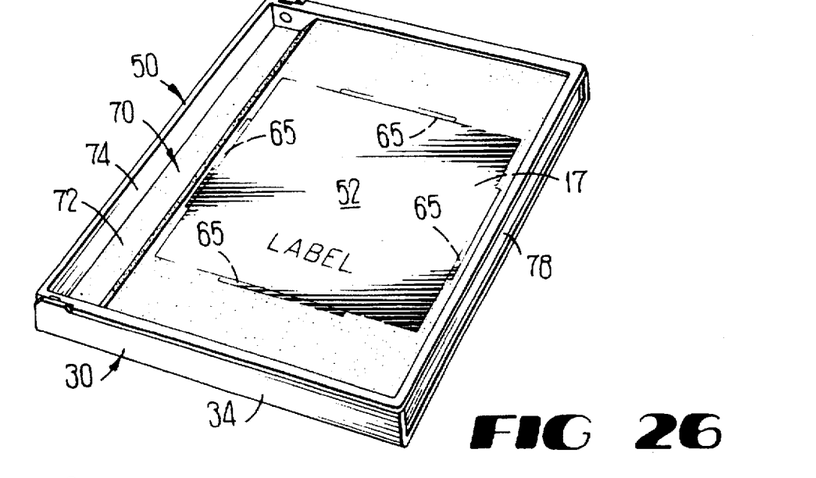
FIG. 26 is a bottom perspective view of the container of FIG. 24 having rims in the base tray in the closed position, with a mini-disk cartridge.
Figure 27:
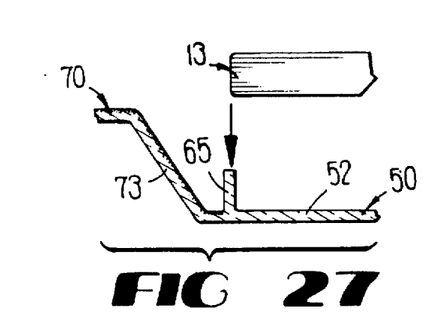
FIG. 27 is a cross-sectional side view of the container in the closed position along line 27 of FIG. 24, with a mini-disk cartridge ready for insertion into the rims of the base tray.
Figure 28:
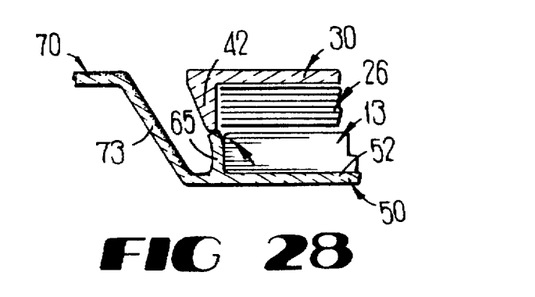
FIG. 28 is a cross-sectional side view of the container in the closed position along line 28 of FIG. 25 with a mini-disk cartridge and a booklet inserted.

When the container 10 is in the closed position, as shown in FIG. 25, a mini-disk cartridge 13 may be placed in the container 10 within the raised rims 65 of the base tray 50. As in the preferred embodiment, a booklet or card 26 is placed under the cover 30 and the mini-disk cartridge 13 is inserted into the base tray 50 with the non-label side 19 facing the cover 30. The booklet or card 26 can be easily seen through the cover's transparent top 32. As shown in FIG. 26, the mini-disk cartridge's label side 17 can be observed through the base tray's transparent bottom surface 52.

As best shown in FIGS. 25 to 28, the raised rims 65 substantially surround the mini-disk cartridge 13 to secure it. When the container 10 is in the closed position, the cover's rear wall 42 rests on top of the rim 65 closet to the base tray's inner rear wall 73.

While several preferred embodiments of the present invention of a storage container for mini-disk cartridge have been illustrated and described, persons skilled in the art will readily appreciate that various additional modifications and embodiments of the invention may be made without departing from the spirit of the invention as defined by the following claims.

I claim:

1. A case for containing a disk cartridge comprising:

a box-shaped base having a recess which is shaped to receive the disk cartridge mounted in a stationary position therein;

a lid member for opening and closing said recess, said lid member having a rear wall depending downwardly toward said base when said lid member is in a closed orientation with respect to said base;

said disk cartridge having a back wall with a rear ledge formed at the top thereof, said rear ledge having a rear cover support formed at the bottom thereof which serves as a rest for the rear wall of the lid member when the lid member is in its closed orientation;

connecting means for rotatably connecting said lid member and said base; and regulating means provided between said base and said lid member for regulating the rotational angle of said lid member, said regulating means including at least one groove, said projection being engaged in said groove, said projection being formed on one of said base or said lid member and said groove being formed in the other of said base or said lid member and wherein said groove is arc-shaped and concentric with the rotational center of said connecting means; and wherein said projection is moved in said groove upon rotational movement of said lid member relative to said base from a first end position of said groove, wherein said lid member is retained in an opened position pivoted approximately 180 degrees from said base, and a second end position of said groove, wherein said lid member is retained in its said closed orientation with respect to said base and said rear wall of said cover rests on said rear cover support of said disk cartridge.

2. A case for containing a disk cartridge according to claim 1, wherein said projection is formed on a lateral side of said one of said base member or said lid member and said groove is formed in a lateral side of the other of said base or said lid member.

3. A case for containing a disk cartridge according to claim 1, wherein said projection is moved from one end portion of said groove to another end portion of said groove upon rotational movement of said lid member relative to said base.

4. A case for containing a disk cartridge according to claim 1, wherein said connecting means comprises a hinge projection formed on one of said base or said lid member and an opening receiving said hinge projection and which is formed in the other of said base or said lid member, and said groove is arc-shaped and concentric with the rotational center of said hinge means.

5. A case for containing a disk cartridge according to claim 1, wherein said case further comprises locking means for locking said lid member at a position for closing said base.

* * * * *